(12) United States Patent
Cho et al.

(10) Patent No.: US 7,772,500 B2
(45) Date of Patent: Aug. 10, 2010

(54) OVERHEAD AND UNDERGROUND POLE MOUNT CABLE RESTRAINT INSULATOR

(75) Inventors: May K. Cho, Sudbury, MA (US); Robert Mielinski, Upton, MA (US)

(73) Assignee: Marmon Utility LLC, Milford, NH (US)

( * ) Notice: Subject to any disclaimer, the term of this patent is extended or adjusted under 35 U.S.C. 154(b) by 361 days.

(21) Appl. No.: 12/069,249

(22) Filed: Feb. 8, 2008

(65) Prior Publication Data

US 2008/0190649 A1    Aug. 14, 2008

Related U.S. Application Data

(60) Provisional application No. 60/889,854, filed on Feb. 14, 2007.

(51) Int. Cl.
*H01B 17/00* (2006.01)

(52) U.S. Cl. ................ 174/157; 174/656; 174/138; 174/150; 174/668; 439/472

(58) Field of Classification Search .............. 174/655, 174/653, 659, 668, 138, 150, 157; 439/472, 439/473; 248/56; 16/2.1
See application file for complete search history.

(56) References Cited

U.S. PATENT DOCUMENTS 1,997,109 A * 4/1935 Fyfe ........................... 254/232
4,840,581 A * 6/1989 Leufert et al. ............... 439/472

* cited by examiner

*Primary Examiner*—Dhiru R Patel
(74) *Attorney, Agent, or Firm*—Jennifer E. Lacroix, Esq.; DLA Piper LLP (US)

(57) ABSTRACT

An improved pole mount cable restraint insulator is described featuring a pin and bolt locking mechanism that may be used to secure a medium voltage 5 kV to 35 kV electrical cable to the insulator and riser pole. The cable restraint insulator includes a seat to secure the cable. A further improvement over existing cable restraints is the polymer insulating materials used in the construction. Such materials are lighter in weight, electrically track resistant, lower in cost and non-breakable. The cable restraint insulator may be constructed by injection molding and/or casting with variety of electrically insulating polymers.

14 Claims, 5 Drawing Sheets

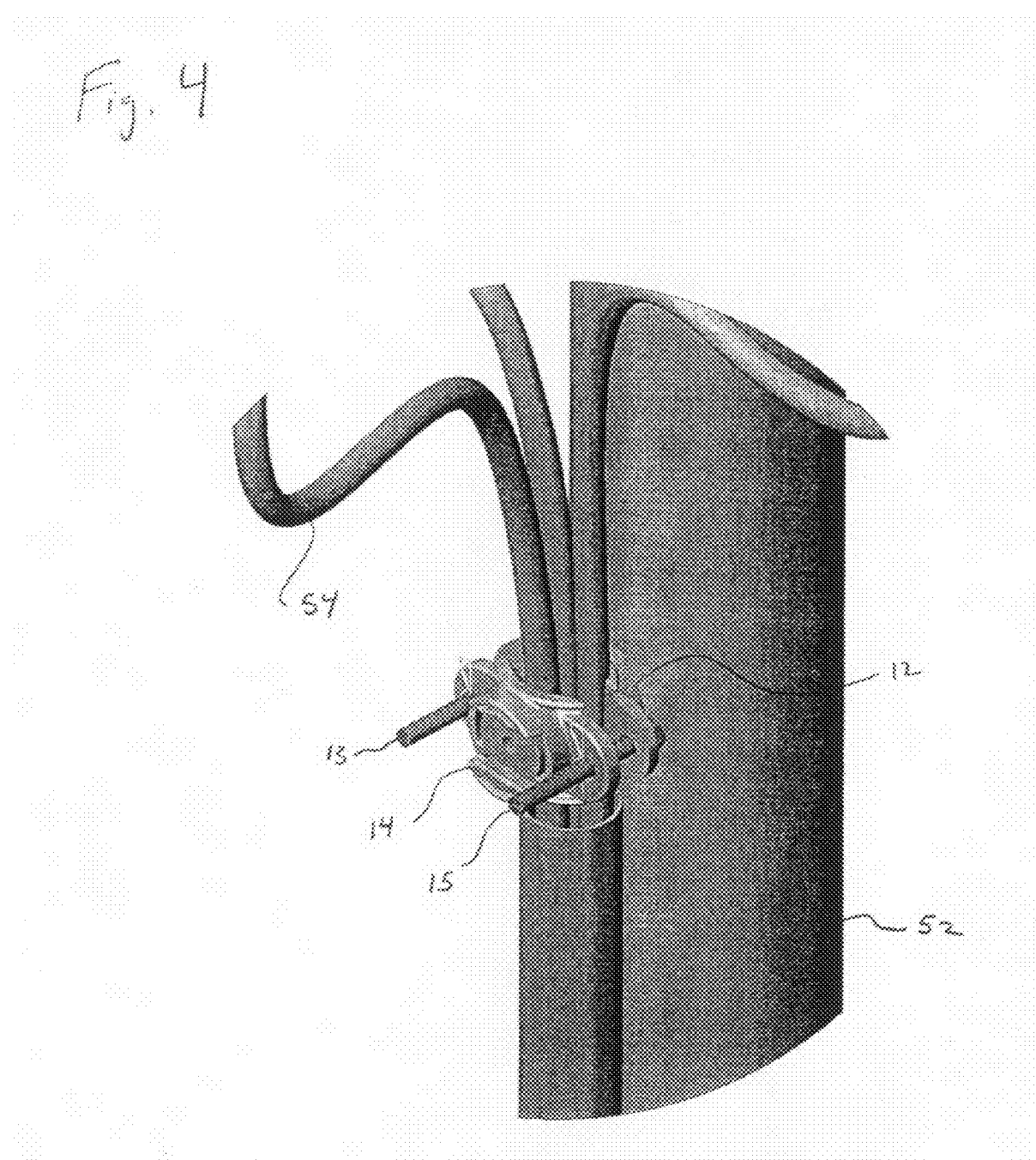

OVERHEAD AND UNDERGROUND POLE MOUNT CABLE RESTRAINT INSULATOR

CLAIM OF PRIORITY

This application claims priority from U.S. Provisional Patent Application Ser. No. 60/889,854, filed Feb. 14, 2007.

FIELD OF THE INVENTION

The invention relates generally to overhead and underground power distribution equipment and, more particularly, to a pole mount cable restraint insulator.

BACKGROUND

Electric utility companies use cable restraint insulators to mount power lines, such as medium voltage cables (for example, 5 kV to 35 kV), to riser poles and to bus bars in underground vaults or substations. These insulators typically feature two parts: 1) a clamp portion to secure the cables to the insulator and 2) a mount portion to secure the insulator to the riser pole or bus bar. Cable clamp portions must be constructed in many discreet sizes to accommodate various cable insulation diameters. A need therefore exists for an insulator with a clamp portion that can accommodate a variety of cable sizes.

In addition, most often the clamp portions of insulators are constructed using metal and/or porcelain components. While such materials function well, improvements in terms of weight, cost and durability are desirable.

BRIEF DESCRIPTION OF THE DRAWINGS

FIG. 4 is an enlarged view of portion A of FIG. 3.

DETAILED DESCRIPTION OF EMBODIMENTS

Figure 1:
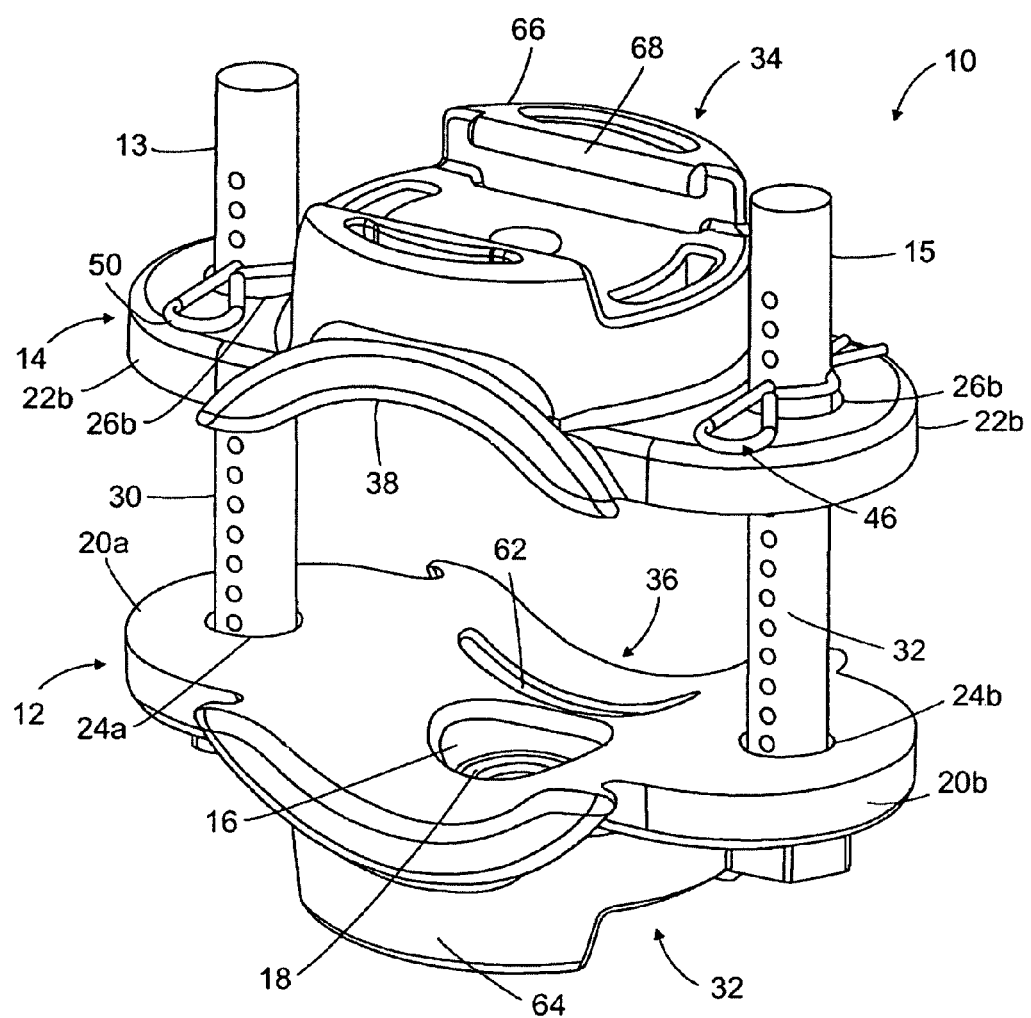
FIG. 1 is a perspective view of an embodiment of the assembled cable restraint insulator of the invention.

An embodiment of the cable restraint insulator is indicated in general at 10 in FIG. 1. The insulator includes a pair of identical body halves indicated, indicated in general at 12 and 14. As will be explained in greater detail below, body halves 12 and 14 are secured together by elongated retaining members, such as thread-less bolts 13 and 15.

Body half 12 attaches to a riser pole or bus bar (in an underground vault or station) or other structure by use of a mounting hole indicated at 16. As used herein, the terms "pole" and "bar" mean the same structure. As illustrated in FIG. 1, the mounting hole may be counter bored to allow the use of an optional locking washer 18, which is preferably constructed of metal. As an example only the washer preferably has a thickness of approximately 1/16". The mounting hole 16 counter bore diameter is sufficient to allow the use of a standard or deep well hex-head or square-head bolt which is received by a bore in the riser pole or bus bore in addition to mounting hole 16.

As illustrated in FIG. 1, body half 12 features a pair of side tabs 20a and 20b, while body half 14 features a corresponding pair of side tabs 22a and 22b. Side tabs 20a and 20b feature fastener openings 24a and 24b, while side tabs 22a and 22b feature corresponding fastener openings 26a and 26b. Body halves 12 and 14 also feature center portions, indicated in general at 32 and 34, respectively. In addition to the mounting hole 16, the center portion 32 of body half 12 features a generally concave cable seat 36. The center portion 34 of body half 14 features generally concave cable seat 38.

Figure 2:
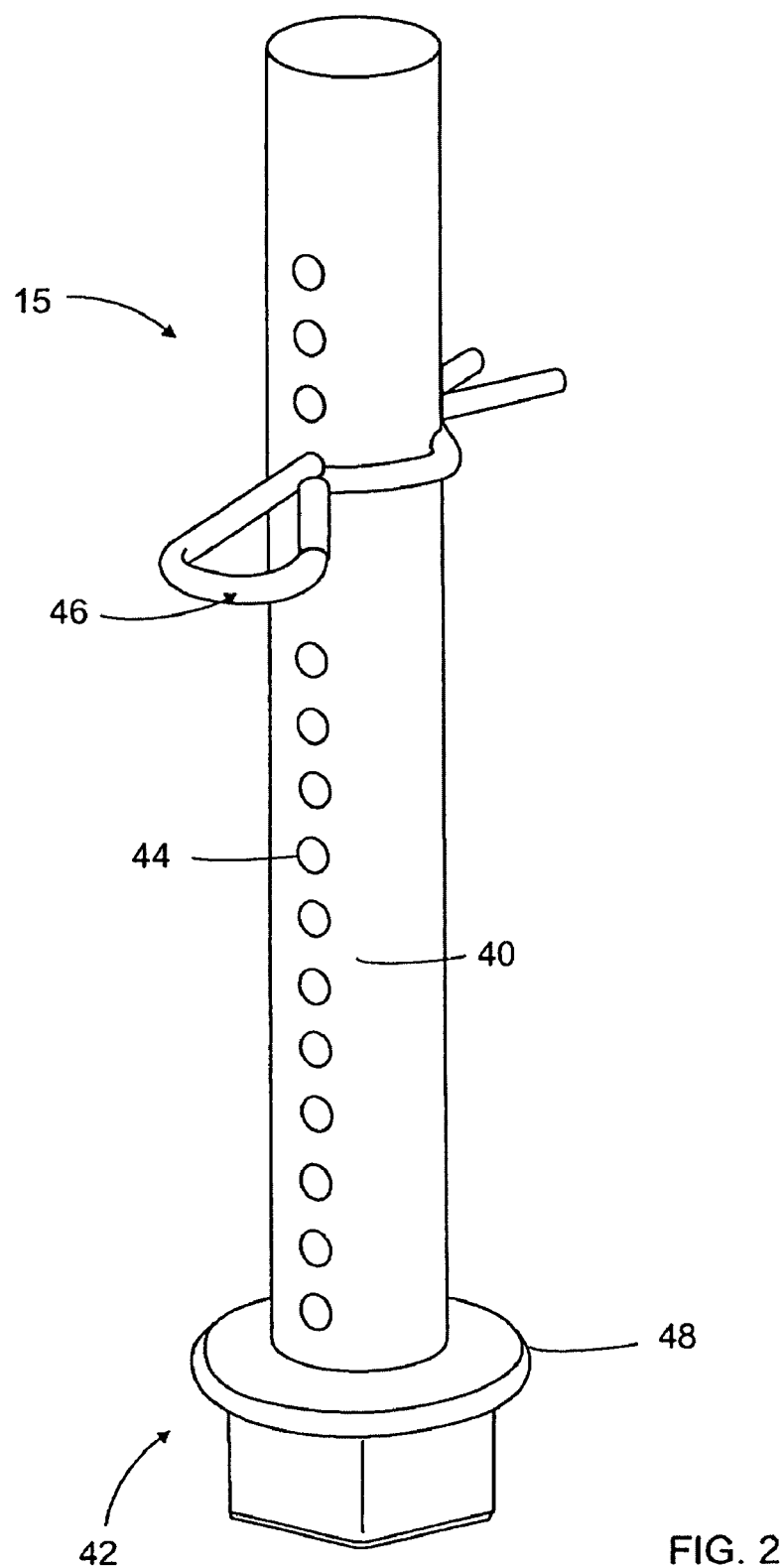
FIG. 2 is an enlarged perspective view of one of the thread-less locking bolts and pins of the cable restraint insulator of FIG. 1.

An enlarged view of thread-less bolt 15 is presented in FIG. 2. The thread-less bolt features a shaft portion 40 and a head portion, indicated in general at 42. The shaft portion 40 features a number of spaced apertures 44 aligned with the longitudinal axis of shaft 40. A locking pin 46 engages the apertures in a removable fashion. The head portion 42 of the thread-less bolt includes a flange 48. As illustrated in FIG. 1, the shaft portion 40 of thread-less bolt 15 passes through the aligned tab openings 24b and 26b of body halves 12 and 14 with the flange 48 engaging the underside of tab 20b. Locking pin 46 secures the assembled pieces together as shown in FIG. 1.

Thread-less bolt 13 of FIG. 1 features the same construction of thread-less bolt 15 and is received through the aligned tab openings 24a and 26a of body halves 12 and 14. Locking pin 50 secures the assemble pieces together as shown in FIG. 1.

While locking pins 46 and 50 are preferably metal spring pins (as illustrated in the figures), other types of fasteners known in the art may alternatively be used. Such fasteners may or may not require apertures in the thread-less bolts 13 and 15. For example, the locking pin could instead clamp down on the shafts of thread-less bolts 13 and 15. Such an arrangement may or may not require one or more grooves or slots formed in thread-less bolts 13 and 15. In addition, standard threaded bolts could be substituted for thread-less bolts 13 and 15 as the elongated retaining members and nuts used in place of locking pins 46 and 50 as fasteners. As yet another alternative, a plastic one-time use "zip" bolt could be used which functions the same as a zip tie but features a shaft portion instead of the prior art tie portion.

Figure 3:
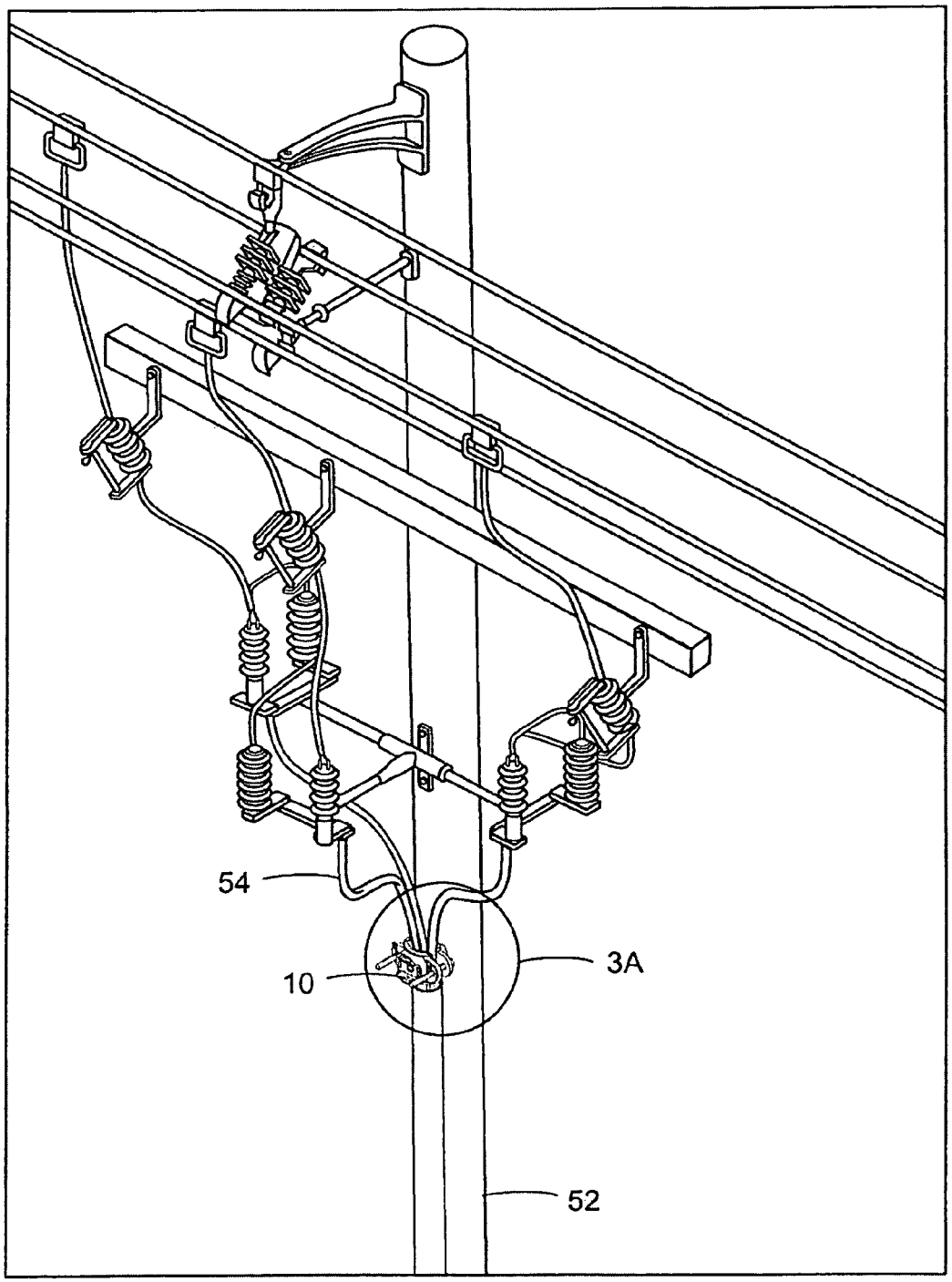
FIG. 3 is a perspective view of the cable restraint insulator and thread-less locking bolts of FIGS. 1 and 2 mounted on a pole and supporting power lines.
Figure 3A:
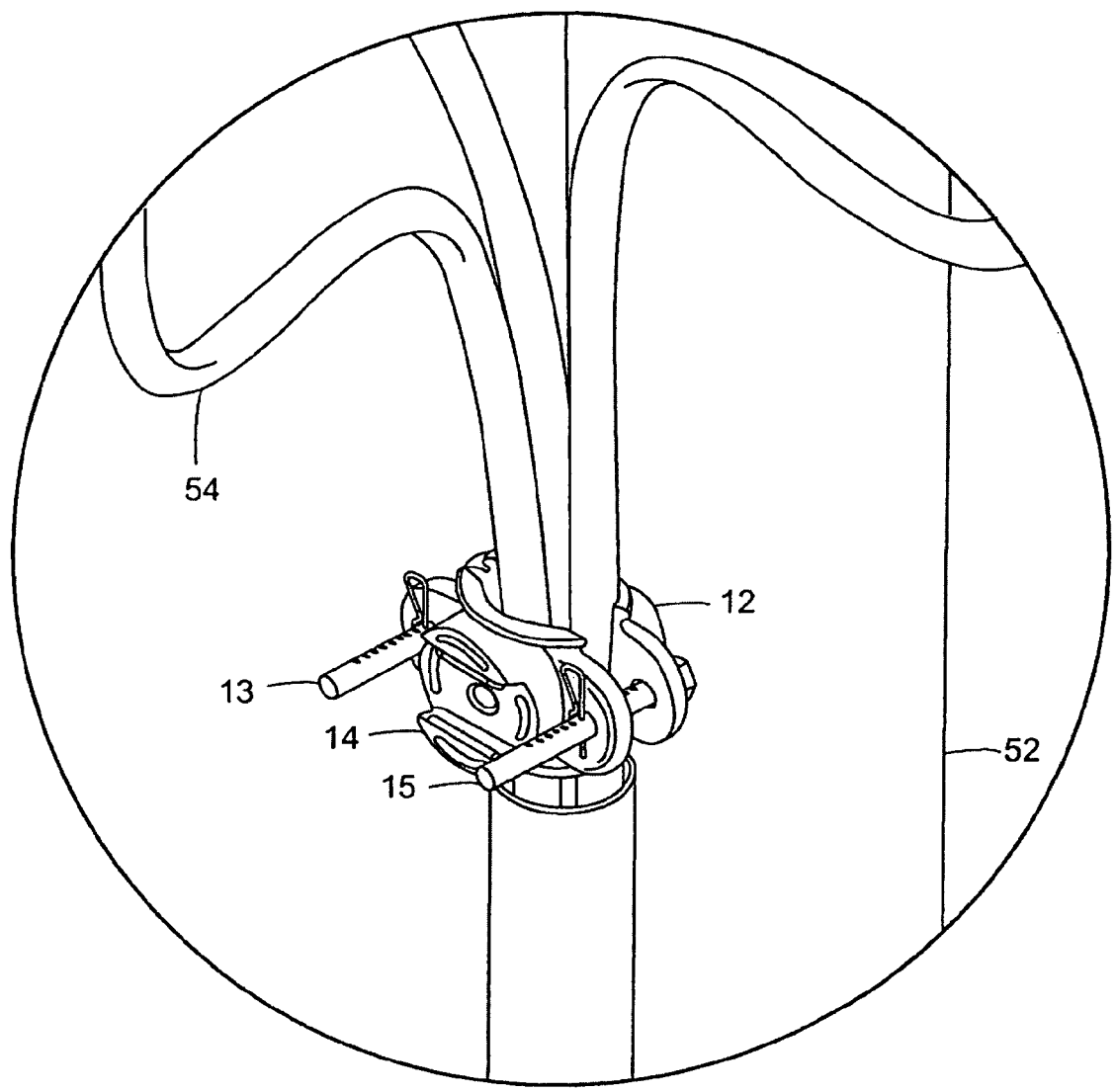

As illustrated in FIGS. 3 and 4, body half 12 of the cable restraint insulator 10 is mounted to a riser pole, indicated at 52. As noted previously, the cable restraint insulator may be mounted to a bus bar or other structure in the same manner. One or more cables 54 are positioned in the seat of body half 12. As illustrated in FIG. 4, body half 14 is positioned so that its seat is placed on the top of the cable(s). Installation of the thread-less bolts 13 and 15 and corresponding locking pins thru the body half tabs completes the installation of the cable restraint insulator. The multiple apertures along the shaft portions of thread-less bolts 13 and 15 permit the cable restraint insulator to accommodate cables of various diameters and various numbers of cables by allowing incremental adjustment of the spacing between cable seats 36 and 38 (FIG. 1).

The cable restraint insulator body halves 12 and 14, and the thread-less bolts 13 and 15 are preferably constructed of injection molded track resistant high density polyethylene (HDPE). To those skilled in the art of molding and casting, however, it is apparent that the materials may be of any number of materials such as HDPE, epoxies (Cycloaliphatics), or polyurethane and also that the cable restraint insulator body and bolts may also be cast rather than injection molded. As indicated at 62 in FIG. 1, a number of slots may be molded into the body halves 12 and 14 to provide material and weight savings.

As illustrated in FIG. 1, center portions 32 and 34 of the body halves each feature a pair of opposing bosses 64 and 66, respectively, so that a slot is formed between each pair. The slots each receive a tab portion of a hanger bar or bracket, which is well known in the art, to allow an alternate hanger bracket mounting method. The slot of body half 14 is provided with slide member 68 to aid in securing the body half to the hanger bracket. Of course the slot of body half 12 features a similar slide member.

The embodiment of the invention described above therefore provides an improved cable restraint mount insulator and clamping system that incorporates a unique adjustable arrangement and method for securing the cable in the hanger mount and, in the preferred embodiment, a HDPE insulating material. Such materials are lighter in weight, electrically track resistant, lower in cost and generally non-breakable.

While the preferred embodiments of the invention have been shown and described, it will be apparent to those skilled in the art that changes and modifications may be made therein without departing from the spirit of the invention, the scope of which is defined by the appended claims.

What is claimed is:

1. A cable restraint insulator comprising:
   a) a pair of body halves with generally concave seats positioned at least one each on said pair of body halves, each of said seats being adapted to receive one or more cables and at least one of said body halves adapted for mounting to a structure; and
   b) an elongated retaining member joining the pair of body halves so that the seats of the pair of body halves oppose one another, said elongated member including a first bolt featuring a shaft portion having a plurality of apertures and a first locking pin that removably engages one of the apertures of the shaft, and permitting adjustment of spacing between the opposing seats so that one or more cables are retained between the opposing seats; wherein each of said body halves includes a side tab having a fastener hole to accept the shaft portion of the first bolt.

2. The cable restraint insulator of claim 1 wherein both the elongated retaining member and the pair of body halves are made of the same thermoplastic material.

3. The cable restraint insulator of claim 2 wherein the thermoplastic material is high density polyethylene.

4. The cable restraint insulator of claim 1 wherein the elongated retaining member is made of high density polyethylene.

5. The cable restraint insulator of claim 1 wherein the pair of body halves are made of high density polyethylene.

6. The cable restraint insulator of claim 1 further comprising a second bolt featuring a shaft portion having a plurality of apertures and a first locking pin that removably engages one of the apertures of the shaft portion of the second bolt.

7. The cable restraint insulator of claim 6 wherein each of said body halves includes a pair of side tabs, each of said side tabs including a fastener hole to accept the shaft portion of one of said bolts.

8. The cable restraint insulator of claim 1 wherein at least one of the pair of body halves includes a mounting hole through which the cable restraint insulator may be bolted to a pole.

9. The cable restraint insulator of claim 8 wherein the mounting hole is counter bored and further comprising a locking washer positioned in the counter bore.

10. The cable restraint insulator of claim 1 wherein at least one of the pair of body halves includes a set of slots through which the cable restraint insulator may be mounted to a pole.

11. The cable restraint insulator of claim 1 wherein at least one of the pair of body halves includes a slide adapted to maintain engagement of the cable restraint insulator with a horizontal hangar bracket.

12. A cable restraint insulator comprising:
    a) a first body half having a generally concave first seat, said first body half adapted for attachment to a structure;
    b) a second body half having a generally concave second seat; and
    c) elongated retaining members joining the first and second body halves so that the first and second seats oppose one another, said elongated members including first and second bolts, each of said bolts featuring a shaft portion having a plurality of apertures and a locking pin that removably engages one of the apertures of the shaft and permitting adjustment of spacing between the opposing first and second seats so that one or more cables are retained between the opposing first and second seats; wherein each of the body halves includes a pair of side tabs, each of said side tabs including a fastener hole to accept the shaft portion of one of said bolts.

13. The cable restraint insulator of claim 12 wherein the elongated retaining member is made of high density polyethylene.

14. The cable restraint insulator of claim 12 wherein the first and second body halves are made of high density polyethylene.

* * * * *